United States Patent
Hull, Jr. et al.

(10) Patent No.: US 10,781,271 B2
(45) Date of Patent: Sep. 22, 2020

(54) METHOD FOR PRODUCING BROMINATED AND HALOHYDRATED POLYMERS

(71) Applicant: DDP SPECIALTY ELECTRONIC MATERIALS US, INC., Collegeville, PA (US)

(72) Inventors: John W. Hull, Jr., Midland, MI (US); Shari Kram, Midland, MI (US); Michal Elizabeth Porter, Midland, MI (US); William G. Stobby, Ann Arbor, MI (US)

(73) Assignee: DDP SPECIALTY ELECTRONIC MATERIALS US, INC., Collegeville, PA (US)

(*) Notice: Subject to any disclaimer, the term of this patent is extended or adjusted under 35 U.S.C. 154(b) by 0 days.

(21) Appl. No.: 16/569,785

(22) Filed: Sep. 13, 2019

(65) Prior Publication Data

US 2020/0002442 A1    Jan. 2, 2020

Related U.S. Application Data

(62) Division of application No. 15/542,424, filed as application No. PCT/US2016/015216 on Jan. 27, 2016, now Pat. No. 10,457,751.

(60) Provisional application No. 62/109,777, filed on Jan. 30, 2015.

(51) Int. Cl.
C08J 9/00      (2006.01)
C08C 19/12     (2006.01)
C08F 8/20      (2006.01)

(52) U.S. Cl.
CPC ............... *C08C 19/12* (2013.01); *C08F 8/20* (2013.01); *C08J 9/00* (2013.01); *C08J 2309/06* (2013.01)

(58) Field of Classification Search
CPC ..... C08C 19/12; C08F 8/20; C08J 9/00; C08J 2309/06
See application file for complete search history.

(56) References Cited

U.S. PATENT DOCUMENTS

| | | | | |
|---|---|---|---|---|
| 3,534,119 A | * | 10/1970 | Relyea | C08L 23/16 525/138 |
| 9,238,723 B2 | * | 1/2016 | Kim | C08L 53/02 |
| 2013/0178577 A1 | * | 7/2013 | Kreuder | B82Y 30/00 524/574 |
| 2013/0178589 A1 | | 7/2013 | King et al. | |
| 2014/0121330 A1 | | 5/2014 | Gorman | |

FOREIGN PATENT DOCUMENTS

| WO | 2008/021418 A1 | 2/2008 |
|---|---|---|
| WO | 2009/134628 A1 | 11/2009 |
| WO | 2010/021906 A1 | 2/2010 |
| WO | 2011/008417 A1 | 1/2011 |
| WO | 2012/044482 A1 | 4/2012 |

* cited by examiner

*Primary Examiner* — John M Cooney

(57) ABSTRACT

Conjugated diene polymers such as a styrene-butadiene copolymer are sequentially brominated by reaction with a quaternary ammonium tribromide or quaternary phosphonium tribromide and halohydrated by reaction with an N-haloimide compound. This produces a brominated and halohydrated polymer with very good thermal stability. The product is useful as a flame retardant in a variety of polymer systems.

12 Claims, No Drawings

METHOD FOR PRODUCING BROMINATED AND HALOHYDRATED POLYMERS

This application is a division of U.S. application Ser. No. 15/542,424, filed Jul. 8, 2017, which is now U.S. Pat. No. 10,457,751, issued Oct. 29, 2019.

The present invention relates to methods for making brominated and halohydrated polymers.

Recently, brominated styrene-butadiene block copolymers have been developed as flame retardants for organic polymers. These products function by evolving HBr under fire conditions. Therefore the lability of the carbon-bromine bonds in these brominated polymers is instrumental to performance. If the carbon-bromine bond is too thermally stable, HBr liberates slowly if at all even under fire conditions, and the brominated copolymer performs inadequately. Aromatically-bound bromine suffers from this problem. On the other hand, if the carbon-bromine bond is thermally unstable, HBr or bromine is released prematurely during melt-process operations that are used to form the organic polymer into useful articles. Premature loss of bromine leads to a myriad of problems, including environmental, potential health and safety issues, corrosion in processing equipment, crosslinking, and loss of effectiveness of the flame retardant. Bromine atoms bonded to tertiary and/or allylic carbons tend to be thermally unstable at typical melt processing conditions.

The recent emergence of brominated styrene-butadiene block copolymers as flame retardants is attributable to the development of highly selective bromination methods that almost entirely avoid bromination on aromatic rings and at tertiary and allylic carbon atoms. These methods are based on tertiary ammonium tribromide and tertiary phosphonium tribromide compounds as the brominating agent. See, e.g. WO 2007/021418 and WO 2010/021906. In addition to their selectivity, methods using these brominating agents permit high conversions of the butadiene units.

The brominated styrene-butadiene copolymers are hydrophobic materials that, due to the selectivity of the bromination process, have few if any functional groups other than the bromine atoms themselves. The presence of other functional groups, hydroxyl groups in particular, can be beneficial for various reasons. Hydroxyl groups can lend some polarity or hydrophilic character to the polymer. That can affect, in an advantageous way, its compatibility with certain polymers or blowing agents, thereby extending the types of polymer systems in which the brominated copolymers are useful as well as in some cases improving their performance. A more polar brominated copolymer could alter the permeability of gases through polymer films in a way that is beneficial for certain applications like polymer insulation foam and semi-permeable membranes. Greater polarity can render the polymer more easily dispersible in water or other polar solvents. Furthermore, functional groups like hydroxyl groups in some cases can serve as reactive sites at which further chemistry can be performed, to tailor the brominated copolymer to specific applications.

WO 2011/008417 describes methods for making brominated and epoxidized styrene-butadiene block copolymers (among other compounds). The bromination and epoxidation reactions are performed sequentially, in either order. A comparative example describes epoxidizing a styrene-butadiene copolymer by reaction with meta-chloroperbenzoic acid, followed by bromination with elemental bromine. The product has no remaining epoxy groups, which is attributed to the generation of hydrogen bromide, which reacts across the epoxy groups formed in the initial epoxidation reaction. The hydrogen bromide/epoxy reaction produces hydroxyl groups. However, a large amount of bromine also becomes bound to tertiary and allylic carbon atoms, which has an adverse affect on the thermal stability of the product.

What is desired is a process for producing a highly brominated butadiene polymer that also contains hydroxyl groups, in which little if any bromine is bound to tertiary or allylic carbon atoms.

This invention is in one aspect a process for preparing a brominated and halohydrated polymer of at least one conjugated diene, comprising (a) reacting a starting polymer of at least one conjugated diene with a quaternary ammonium tribromide, quaternary phosphonium tribromide compound or both a quaternary ammonium tribromide and a quaternary phosphonium tribromide to brominate 50% to 98% of the conjugated diene repeating units in the starting polymer and form a partially brominated polymer and then (b) reacting the partially brominated polymer with an N-haloimide compound in the presence of water and a water-miscible solvent system for the partially brominated polymer to halohydrate at least a portion of the remaining conjugated diene repeating units and produce a brominated and halohydrated polymer.

For purposes of this invention, "halohydration" refers to a reaction by which an aliphatic carbon-carbon double bond reacts to form a halohydrin, i.e., a structure in which a halogen atom becomes bonded to one of the originally double-bonded carbon atoms and a hydroxyl group becomes bonded to the other originally double-bonded carbon atom, i.e., the following structure (I):

moiety, where X represents the halogen atom and the X and OH groups are bonded to the carbon atoms that were originally double-bonded to each other. The term "halohydrated" polymer refers to one in which at least some of the conjugated diene units have been reacted to form such a halohydrin moiety.

The brominated and halohydrated polymer produced in the process has the requisite thermal stability for use as a flame retardant for other organic polymers. The halogen atoms (from each of the reaction steps) add almost exclusively across double bonds of the conjugated diene units with very little if any halogen atoms becoming bonded to allylic or tertiary carbon atoms. In the preferred case in which the starting polymer is a copolymer of styrene and a conjugated diene monomer, little if any ring bromination occurs.

The hydroxyl groups impart increased hydrophilicity to the brominated and halohydrated polymer, the extent of which increase varies with the proportion of conjugated diene units that become halohydrated in the process. Even a small proportion of hydroxyl groups can affect significantly the compatibility of the polymer with certain blowing agents such as water and carbon dioxide. This, in turn, has been shown to have a beneficial effect when the brominated and halohydrated polymer is blended with another organic polymer and then foamed. Cell size tends to be larger, compared to the case where the polymer is brominated but not halohydrated; this larger cell size relates to more efficient expansion of the foam. The hydroxyl groups also affect gas permeability through films of the brominated and halohydrated polymer, and thus affords a mechanism for producing semi-permeable membranes.

By increasing the proportion of halohydrated units, the brominated and halohydrated polymer can be rendered soluble or at least dispersible in water and/or polar solvents. This allows the material to be used as a flame retardant in a much wider array of applications than the merely brominated material. For example, such a brominated and halohydrated polymer can be dissolved or dispersed into water and/or a polar solvent and applied as a topical flame retardant by spraying or otherwise coating it onto a variety of substrates. The brominated and halohydrated polymer also in some embodiments is sufficiently compatible with compounds having hydroxyl groups such as polyols that are useful in urethane formulations, and so can be incorporated into polyurethane polymers to provide flame-retardant properties thereto.

The hydroxyl groups on the brominated and halohydrated polymer represent functional groups at which various chemical reactions can be performed. This potentially permits the brominated and halohydrated polymer to be grafted onto other polymers and molecules, and permits further functionalization of the material through one or more reactions at the hydroxyl groups. The brominated and halohydrate product can be coupled, branched and/or crosslinked through contact with a curing agent such as a polyisocyanate, epoxy resin or polycarboxylic acid. The hydroxyl groups also can be converted to epoxide groups through treatment with a base. The epoxide groups are additional sites at which various chemical reactions can be performed to functionalize and/or couple, branch or crosslink the polymer.

The invention is also a brominated and halohydrated polymer of at least one conjugated diene, wherein 2 to 50% of the conjugated diene units of the polymer are halohydrated, 50 to 98% of the conjugated diene units are brominated and 0 to 10% of the conjugated diene units are unreacted, which brominated and halohydrated polymer has a 5% weight loss temperature of at least 250° C.

Suitable polymers of conjugated diene monomers contain at least 30%, more preferably at least 50%, by weight of polymerized conjugated diene units. The polymer may be, for example, a homopolymer of one conjugated diene, a copolymer of two or more conjugated dimes, or a copolymer of at least one conjugated diene and at least one other monomer that is not a conjugated diene. Polymerized conjugated (hone units are repeating units formed when a conjugated diene monomer is polymerized. Such repeating units contain aliphatic carbon-carbon double bonds that are susceptible to bromination and halohydration. The aliphatic carbon-carbon double bonds can be "terminal" types, i.e., having the form

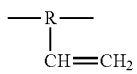

or "internal" types having the form —R—CH═CH—R—, wherein the R groups in each case form carbon-carbon single bonds to the adjacent —CH═ moiety. In the preferred case where the conjugated diene monomer is butadiene, the terminal and internal butadiene units have the forms

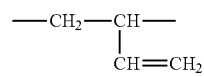

and —CH$_2$—CH═CH—CH$_2$—, respectively. The polymer of the conjugated diene may contain both internal and terminal types of carbon-carbon double bonds. For example, most commercially available butadiene polymers, including most commercially available polybutadiene homopolymers and styrene/butadiene block copolymers, tend to have both types of butadiene units in varying proportions. It is preferred that at least 10%, more preferably at least 50%, up to 99%, more preferably up to 80%, of the conjugated diene repeating units in the polymer are the terminal type.

Suitable monomers other than conjugated dienes are those that can be randomly and/or block copolymerized with the conjugated diene monomer(s), or otherwise can form a copolymer (such as by grafting, for example) with the conjugated diene monomer(s) or a polymer thereof. Vinyl aromatic monomers are preferred types and styrene is an especially preferred comonomer. Other monomers include olefins such as ethylene and propylene, acrylate or acrylic monomers such as methyl methacrylate, methyl acrylate, acrylic acid, and the like.

The starting polymer should be thermally stable and, accordingly, should not contain structures that cause the brominated and halohydrated polymer to degrade or decompose significantly at temperatures below 180° C. The starting polymer (as well as the brominated and halohydrated polymer produced in this process) preferably is free of metal and semi-metal atoms. A preferred starting polymer contains the elements carbon, hydrogen and optionally oxygen, with all other elements each constituting at most 1% of the total weight of the starting polymer.

Butadiene homopolymers and styrene/butadiene copolymers (especially block copolymers) are of particular interest as the starting material. Styrene/butadiene diblock and triblock copolymers are most preferred, although block copolymers having other architectures such as star-block and asymmetrical block structures are useful.

Suitable polymers of the conjugated diene monomer include those having a weight average molecular weight ($M_w$) of at least 1000 g/mol. The weight average molecular weight may be at least 2000, at least 5000, at least 10,000, at least 20,000 or at least 40,000. The molecular weight may be, for example, as high as 500,000, as high as 200,000, as high as 100,000 or as high as 85,000. For purposes of this invention, molecular weights of about 2,000 or higher are apparent molecular weights as measured by Gel Permeation Chromatography (GPC), relative to a polystyrene standard. GPC molecular weight, determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The starting polymer is partially brominated by reaction with a quaternary ammonium tribromide and/or quaternary phosphonium tribromide. This partial bromination step is performed until at least 50% of the conjugated diene units of the staring polymer are brominated. If less than about 50% are brominated in this step, large amounts of crosslinking and/or other side reactions tend to occur during the subsequent halohydration step. To minimize these side reactions, it is more preferred to brominate at least, 75% of the conjugated diene units and more preferably at least 85% thereof. Up to 98% of the conjugated diene units may be brominated in this step. In some embodiments, up to 95%, up 90%, up to 85% or up to 80% of the conjugated dime units are brominated in this step. Correspondingly, at least 2% of the conjugated diene units remain unbrominated in this step of the process.

For purposes of this invention, an aliphatic carbon-carbon double bond is said to be "brominated" when two atoms of bromine are added across the double bond to form a —CHBr—CHBr—Y moiety where Y is another repeating unit in the polymer or, in the case of a terminal group, a hydrogen.

Suitable methods for brominating an unsaturated starting material with a quaternary ammonium tribromide or a quaternary phosphonium tribromide are described, for example, in WO2008/021418 and in WO 2010/021906. Pyridinium tribromide, phenyltrialkylammonium tribromides, benzyltrialkylammonium tribromides and tetraalkylammonium tribromides are suitable quaternary ammonium tribromides. Specific examples include phenyltrimethylammonium tribromide, benzyltrimethylammoniun tribromide, tetramethylammonium tribromide, tetraethylammonium tribromide, tetrapropylammonium tribromide, tetra-n-butylammonium tribromide, or mixtures of any two or more thereof. Suitable quaternary phosphonium tribromides contain a quaternary phosphonium group that can be represented by the formula $R_4P^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl groups having from one to 20 carbon atoms. The R groups more preferably are alkyl groups having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl) phosphonium tribromide, tetrahexylphosphonium tribromide, tetraoctylphosphonium tribromide, trihexyltetradecylphosphonium tribromide, or mixtures of any two or more thereof.

The quaternary ammonium or phosphonium tribromide brominating agent can be prepared by mixing the corresponding quaternary ammonium or phosphonium monobromide salt with elemental bromine. The monobromide salt is usually water-soluble, so a convenient way of making the tribromide is to add elemental bromine to an aqueous solution of the monobromide salt.

The bromination is effected by contacting the starting polymer with the quaternary ammonium and/or phosphonium tribromide. An amount of quaternary ammonium tribromide and/or quaternary phosphonium tribromide is provided to brominate a proportion of conjugated diene units in the starting polymer as described above. Generally, only mild condition are needed to effect the bromination. Bromination temperatures can range from −20 to 100° C. and are preferably from 0 to 85° C. Temperatures higher than 100° C. could be used, but are not necessary and may lead to a loss of selectivity and/or an increase in by-products. The quaternary ammonium or phosphonium tribromide brominating agent becomes converted to the corresponding quaternary ammonium or phosphonium monobromide salt as the reaction proceeds.

The time of the reaction is sufficient to brominate a proportion of the conjugated diene units as described before. The extent of bromination often can be determined using proton NMR methods.

Following the bromination reaction, the partially brominated polymer may be recovered from any solvent that is used, and the isolated material may be purified to remove residual bromine, brominating agent, solvent and by-products.

The partially brominated polymer is then reacted with an N-haloimide compound in the presence of water and a water-miscible solvent system for the partially brominated polymer to halohydrate at least a portion of the remaining conjugated diene repeating units and produce a brominated and halohydrated polymer. The halohydration of a conjugated diene repeating unit results in the formation of halohydrated moieties represented by structure I above. In structure I, X may be fluorine, chlorine, bromine or iodine.

The N-haloimide compound is one having at least one

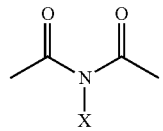

moiety, where X denotes a halogen atom as before. Among the suitable N-haloimide compounds are N-halosuccinimide compounds such as N-chlorosuccinimide, N-bromosuccinimide and N-iodosuccinimide.

The halohydration is performed in a water-miscible solvent system for the partially brominated polymer. The solvent system is one or more liquids in which the partially brominated polymer is soluble at the relative proportions that are present in the reaction. By "water-miscible", it is meant that water is soluble in the solvent system at the relative proportions present in the reaction mixture, as described below. The solvent system may comprise a single solvent in which both water and the partially brominated polymer is soluble. An example of such as solvent is tetrahydrofuran. In other embodiments, the solvent system is a mixture of two or more solvents that are soluble in each other. In such a case, at least one of the solvents is a non-polar material that by itself is a solvent for the partially brominated polymer, and at least one of the solvents by itself is water-soluble. The solvent system solvent preferably is liquid under the conditions of the halohydration reaction and does not undesirably react with the partially brominated polymer or the N-haloimide compound. Examples of solvents that by themselves are solvents for the partially brominated polymer include halogenated alkanes such as carbon tetrachloride, chloroform, dibromomethane, dichloromethane and 1,2-dichloroethane; hydrocarbons such as cyclohexane and toluene, and halogenated aromatic compounds such as bromobenzene, chlorobenzene and dichlorobenzene. Solvents for water include, for example, various ether compounds such as dialkyl ethers and cyclic alkylene ethers. Examples include di-t-butyl ether, diethyl ether, diethylene glycol diethyl ether, diglyme, diiospropyl ether, dimethoxyethane, dimethoxymethane, 1,4-dioxane, 2-methyltetrahydrofuran and morpholine.

The concentration of partially brominated polymer provided to the solution can be, for example, 1 to 50 weight percent, based on the combined weight of partially brominated polymer and solvent system. Preferred amounts are 2 to 25, 2 to 20 or 3 to 15 weight percent on the same basis. The weight of the water is not included in the weight of the solvent system for purposes of calculating this concentration. At least one mole of the N-haloimide compound and at least one mole of water are provided per mole of unconjugated diene units to be halohydrated. An excess of the N-haloimide compound and/or water can be provided if desired. Water in particular can be provided in large excess. For example, water can be provided in amounts such as 0.1 to 1 part or 0.25 to 1 part by weight per part by weight of the solvent system.

In some embodiments, the solvent system and relative amounts of solvent system, partially brominated polymer, water and N-haloimide are selected together so the reaction mixture is clear (although it may be colored) at the start of the reaction.

Like the initial partial bromination reaction, only mild conditions are needed for the halohydration reaction. Reaction temperatures are described for the partial bromination are suitable, with preferred temperatures being 0 to 410° C. being preferred. Pressures are sufficient to maintain the solvent and water in the liquid aggregate state. As the N-haloimide and partially brominated polymer react, the reaction mixture may generate a color, especially in the case when an N-bromoimide or N-iodoimide is the halohydrating agent. The time required to perform the halohydration reaction depends on several factors, including for example, reaction temperature, the particular reactants, concentration of reactants, etc., as well as the amount of halohydration that is to be performed. In general, the halohydration reaction can be performed for a period of one minute to 10 hours, with periods of 5 minutes to 6 hours being typical.

During the halohydration reaction, the N-haloimide compound, water and aliphatic carbon-carbon double bonds react to produce halohydrin groups, i.e., groups represented by structure I above. At least 0.5 percent of the conjugated diene units (based on the number in the starting polymer) are halohydrated.

The bromination and halohydration reactions together preferably consume at least. 90%, more preferably at least 95% and still more preferably at least 98% of the double bonds of the conjugated diene units of the starting polymer. Residual double bonds in the product can lead to undesirable cross-linking reactions, particularly when the product is blended with a bulk polymer for manufacture of extruded articles (foam, film, fiber, moldings etc.). The crosslinking may lead to gel formation and fouling of processing equipment. The presence of gels may lead to impaired physical properties, blemished surface or optical properties, or increased color formation. Gels may affect the ability to melt-process the blends, particularly when the blends are foamed.

If desired, all of the conjugated diene units that were not brominated in the bromination step can be halohydrated, in which cases all of the conjugated diene units of the starting polymer become brominated or halohydrated in the process of the invention.

In some embodiments, 2 to 50% of the conjugated diene units are halohydrated, 50 to 98% of the conjugated diene units are brominated and 0 to 10%, 0 to 5% or 0 to 2% of the conjugated diene units are unreacted. In some embodiments, 5 to 35% of the conjugated diene units are halohydrated, 65 to 95% of the conjugated diene units are brominated and 0 to 10% 0 to 5% or 0 to 2% are unreacted. In other embodiments, 75 to 98% of the conjugated diene units are brominated, 2 to 25% of the conjugated diene units are halohydrated and 0 to 10%, 0 to 5% or 0 to 2% are unreacted. In still other embodiments, 80 to 95% of the conjugated diene units are brominated, 5 to 20% are halohydrated and 0 to 10%, 0 to 5% or 0 to 2% are unreacted.

The brominated and halohydrated polymer preferably contains the elements carbon, hydrogen, oxygen, bromine and optionally nitrogen and one or more of fluorine, chlorine or iodine, with all other elements each constituting at most 1% of the total weight of the compound. More preferably, the brominated and halohydrated polymer contains carbon, hydrogen, oxygen and bromine, with all other elements each constituting at most 1% of the total weight of the compound.

Following the halohydration reaction, the brominated and halohydrated polymer may be recovered from any solvent that is used, and the isolated material may be purified to remove solvent, reagents and by-products.

The brominated and halohydrated polymer so produced typically is characterized in being highly thermal stable. Thermal stability of the brominated and halohydrated polymer is determined, for purposes of the invention, by evaluation of a 5% weight loss temperature, 5% weight loss temperature is evaluated by thermogravimetric analysis, using the following or equivalent method. 10 milligrams of the sample are analyzed using a TA Instruments model Hi-Res TGA 2950 or equivalent device, with a 60 milliliters per minute (mL/min) flow of gaseous nitrogen and a heating rate of 10° C./min, over a range from room temperature (nominally 25° C.) to 600° C. The mass lost by the sample is monitored during the heating step, and the temperature at which the sample has lost 5% of its initial weight is designated the 5% weight loss temperature (5% WLT). Weight losses that occur at about 100° C. or below are generally ignored, as those losses reflect the volatilization or residual solvents or other impurities, rather than a degradation of the brominated and halohydrated polymer. The 5% weight loss temperature of the brominated and halohydrated polymer by this test should be at least 250° C., and preferably is at least 260° C.

The brominated and halohydrated polymer obtained from the foregoing process in some embodiments is a thermoplastic material that contains no more than 3 weight-percent and more preferably no more than 1 weight percent of gel material. Gel material is crosslinked brominated and halohydrated polymer that is insoluble in solvent for the non-crosslinked polymer.

It is also within the scope of the invention to conduct the foregoing process to produce crosslinking, particularly cross-linked particles of defined particle size. Such cross-linked particles have advantages in some applications. For example, in the flame retardant application described below, providing the brominated and halohydrated polymer in the form of crosslinked particles allows the polymer to be provided in a specified particle size that is particularly beneficial in the particular system. The crosslinking also makes the particles resistant to re-sizing or becoming deformed during as it undergoes various processing operations. If to be used as flame retardants, the particles of the crosslinked brominated and halohydrated polymer can be prepared having diameters in the range of, for example, 100 nm to 50 µm, 500 nm to 25 µm or in some instances 1 to 10 µm. The diameter of the particles are taken as that of a sphere having the same volume as the particle. The particle size can be measured by sieving or light scattering methods.

The brominated aid halohydrated polymer is useful as a flame retardant for a variety of other polymers, which for convenience are referred to herein as the "bulk" polymer. The bulk polymers of most interest are thermoplastic materials that are processed into useful articles via a melt-processing operation. The hulk polymer therefore can be any thermoplastic polymer that is capable of being melt-processed at a temperature of 250° C. or below. The bulk polymer and the brominated and halohydrated polymer should be selected together so that the brominated and halohydrated polymer is compatible with the molten bulk polymer. A brominated and halohydrated polymer is considered to be compatible with the bulk polymer for purposes of this invention if it is miscible in the bulk polymer at the relative proportions that are present, or if it can be dispersed within the bulk polymer to form finely dispersed domains. These domains preferably are mainly less than 25 microns and more preferably less than 10 microns in size, although some larger domains may be present. The formation of mainly macroscopic (~100 micron or greater in scale) domains of the brominated and halohydrated polymer in the melt-processed product indicates such a lack of compatibility.

Thermoplastic polymers of interest as the bulk polymer include vinyl aromatic polymers (including vinyl aromatic homopolymers, vinyl aromatic copolymers, or blends of one or more vinyl aromatic homopolymers and/or vinyl aromatic copolymers), as well as other organic polymers in which the brominated and halohydrated polymer is soluble or can be dispersed to form domains of predominantly less than 25 μm, preferably less than 10 μm, in size. Polymers and copolymers of styrene are preferred. Most preferred are polystyrene homopolymers and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the bulk polymer.

Thermoplastic polymers of interest as the bulk polymer also include polyacrylic and polymethacrylate polymers, which may be provided, for example, in the form of pellets or in the form of a latex. Such a resin may be a polymer or copolymer of one or more of methylmethacrylate, acrylic acid, methacrylic acid, butylacrylate and 2-hydroxylethyl acrylate. Examples of polyacrylate and/or polymetharylate polymers include those sold commercially by Lucite under the trade name Elvacite™.

Thermoplastic polyurethane resins are other bulk polymers of interest. These include those sold by The Dow Chemical Company under the trade names Pelathane™ and Isoplast™.

The bulk polymer should have a molecular weight high enough to allow for melt processing. Generally, a number average molecular weight of at least 10,000 is suitable.

The brominated and halohydrated polymer is blended with the bulk polymer to form an organic polymer composition. Enough of the brominated and halohydrated polymer is typically present to provide the organic polymer composition with a bromine content within a range of from 0.1 percent by weight to 25 percent by weight, based upon the total weight of the composition. A preferred bromine concentration in the organic polymer composition (provided by the brominated and halohydrated polymer) from 0.25 to 10 percent by weight, a more preferred amount is from 0.5 to 5 weight percent, and a still more preferred amount is from 1 to 3 weight percent. The amount of the brominated and halohydrated polymer that is needed to provide a given bromine content to the blend will of course depend at least in part on its bromine content. In general, however, as little as about 0.15 parts by weight of the brominated and halohydrated polymer can be provided per 100 parts by weight hulk resin (pphr). At least 0.4 pphr or at least 0.8 pphr of the brominated and halohydrated polymer can be provided. Up to 100 pphr of the brominated and halohydrated polymer can be present in the blend, but a more preferred maximum amount is 40 pphr, a more preferred maximum amount is 20 pphr and a still more preferred maximum amount is 10 pphr or even 6 pphr.

As mentioned before, the brominated and halohydrated polymer may be formed into crosslinked particles, preferably of a defined particle size, prior to blending with the bulk polymer. The crosslinking can be performed during the bromination and halohydration process of the invention. Another way of introducing crosslinking is to react the hydroxyl groups with a curing agent that contains two or more hydroxyl-reactive groups such as, for example but not, limited to, a polyisocyanate, an epoxy resin, a polycarboxylic acid, a polycarboxylic acid ester. Particles can be formed, for example, by performing the reaction while the brominated and halohydrated polymer is dispersed in a liquid phase, by forming an agitated mixture of a heat-softened brominated and halohydrated polymer and the curing agent, or by forming the crosslinked polymer and then forming it into particles by mechanical methods such as grinding. The particles may be encapsulated with, for example, a wax or polymeric material. Encapsulation can impart delayed activity by allowing the brominated and halohydrated polymer to become activated only upon a specific set of conditions, such as elevated temperature or the presence of a solvent for the encapsulant.

In some embodiments, a blend of the brominated and halohydrated polymer and bulk polymer also contains one or more stabilizers and/or acid scavengers. Among these are alkyl phosphites such as are described in "Plastic Additive flandbook", edited by H. Zweifel, $5^{th}$ Ed., p. 441 (2001), various epoxy compounds, tetrasodium pyrophosphate, hydrocalumite, hydrotalcite and hydrotalcite-like clays; polyhydroxyl compounds having a molecular weight of 1000 or below, such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835, and Baerlocher GmbH (i.e., Baerostab™ OM 36, Baerostab™ M25, Baerstab™ MSO, Baerostab™ M63, Baerostab™ OM 710S).

Other, optional ingredients may be present as necessary or desired for the particular melt processing operation.

The organic polymer composition is typically melt processed to form useful articles. Melt processing, for purposes of this invention, involves creating a melt of the bulk polymer and the brominated and halohydrated polymer, forming the melt into some shape, and then cooling the melt to solidify it and form an article. Various melt processing operations are within the scope of this invention, such as extrusion, injection molding, compression molding, casting, and the like. The melt processing operation of most interest is extrusion foaming. In each case, the melt processing operation can be conducted in any convenient manner. Apart from the presence of the brominated and halohydrated polymer, the melt processing operations may be performed in an entirely conventional manner.

Other additives which may be present during the melt processing operation include, for example, lubricants such as barium stearate or zinc stearate; UV stabilizers, pigments, nucleating agents, plasticizers, FR synergists, IR blockers such as carbon black and graphite, and the like.

Extrusion foaming is performed by forming a pressurized melt that contains the bulk polymer, the brominated and halohydrated polymer, a blowing agent and other additives such as may be useful. Once the raw materials have been mixed and the polymer melted, the resulting gel is forced through an opening into a zone of lower pressure, where the blowing agent expands and the polymer solidifies to form a foam. The extruded foam can take the form of a sheet (having a thickness of up to ½ inch (12 mm)), plank or boardstock (having a thickness of from ½ inch (12 mm) to 12 inches (30 cm) or more), or other convenient shape. The foam can be extruded to form coalesced strand foam if desired. The various raw materials can be fed into the processing equipment individually or in various combinations. A premix can be in the form of a dry blend of particles of the bulk polymer and particles of the brominated and halohydrated polymer. Alternatively, or in addition, the bulk polymer and brominated and halohydrated polymer can be melt-blended prior to the melt processing operation, and the molten mixture or particles of the blend can be introduced into the melt processing operation. It is generally preferred to introduce the blowing agent as a separate stream after the polymeric materials have been melted.

The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable. Because the brominated and halohydrated polymer is somewhat hydrophilic (compared to a similar polymer which is only brominated), a blowing agent mixture that contains water and/or at least one alcohol is of particular interest.

The blend of brominated and halohydrated polymer with the bulk polymer exhibits good thermal stability as a neat compound, as indicated by the 5% WILT test described before. A somewhat more stringent test of thermal stability is a 240° C. onset time test, which evaluates the amount of time a blend of the brominated and halohydrated polymer in a bulk polymer can withstand a temperature of 240° C. before measurable weight loss is seen. The brominated and halohydrated polymer is blended with a polystyrene homopolymer at proportions such that the blend contains 1.8% bromine. A sample is heated under nitrogen on a thermogravimetric analyzer to 240° C. as described previously and held at that temperature until the sample exhibits a measurable weight loss. The amount of time that elapses before a measurable weight loss is seen is the 240° C. onset time. The 240° onset time in some embodiments is at least 7 minutes, and preferably is at least 9 minutes, especially in cases in which the bulk polymer is a homopolymer or copolymer of styrene.

The article produced in the melt processing operation can be used in the same manner as similar articles made in other melt processing operations. When the article is a foam, the foam preferably has a density of up to 80 kg/m$^3$, more preferably up to 64 kg/m$^3$ and even more preferably up to 48 kg/m$^3$. Foam that is used as thermal insulation is preferably in the form of boardstock having a density of from 24 to 48 kg/m$^3$. Billet foam preferably has a density of from 24 to 64 kg/m$^3$, more preferably from 28 to 48 kg/m$^3$. The foams preferably have an average cell size in the range of from 0.1 mm to 4.0 mm, especially from 0.1 to 0.8 mm, per ASTM D3576. The foam may be predominantly closed-celled, i.e., may contain 30% or less, preferably 10% or less and even more preferably 5% or less of open cells, per ASTM D6226-05. More highly open-celled foams also may be produced in accordance with the invention.

Boardstock foams made in accordance with the invention are useful as built foam insulation, as part of roof, wall, or floor assemblies. Other foams made in accordance with the invention can be used as decorative billet, pipe insulation and in molded concrete foundation applications.

The brominated and halohydrated polymer is also useful as a flame retardant for isocyanate-based polymers. Isocyanate-based polymers are polymers produced in a reaction of a polyisocyanate with itself (to form a polyisocyanurate and/or a polycarbodiimide, and/or with an isocyanate reactive material such as a polyol (to form a polyurethane or polyurethane-isocyanurate), water or a polyamine (to form a polyurea), or mixtures of such isocyanate-reactive materials (to form, for example, polyurethane-ureas, polyurethane-urea-isocyanurates, etc). The hydroxyl groups of the brominated and halohydrated polymer react with isocyanate groups to incorporate the brominated and halohydrated polymer into the isocyanate-based polymer structure, thus reducing or even eliminating the tendency for the flame retardant to exude or otherwise escape. The hydroxyl groups also lend some compatibility with polyol compounds as are frequently used to make isocyanate-based polymers. This permits the brominated and halohydrated polymer to be blended with one or more polyol compounds and optional components such as crosslinkers, chain extenders, catalysts, surfactants and blowing agents to produce a formulated polyol component for reaction with a polyisocyanate compound to form an isocyanate-based polymer. The increases compatibility of the brominated and halohydrated polymer reduces settling during storage and transport and increases uniformity during the production of the isocyanate-based polymer. The brominated and halohydrated polymer may be reacted with an excess of a polyisocyanate compound to form an isocyanate-terminated prepolymer which can be further reacted as described above to produce an isocyanate-based polymer.

The following examples are provided to illustrate the invention, but not to limit the scope thereof. All parts and percentages are by weight unless otherwise indicated.

EXAMPLE 1

A styrene-butadiene-styrene triblock copolymer containing 46% polymerized styrene and 54% polymerized butadiene is partially brominated by reaction with tetraethylammonium tribromide according the general method described in WO 2007/021418 such that approximately 82% of the butadiene units are broininated. The polymer is recovered from the reaction solvent and dried. 6.13 g of the partially brominated polymer is dissolved in 200 mL tetrahydrofuran. With stirring, 16.35 g of deionized water is added, at which point the solution becomes cloudy. Another 50 mL of tetrahydrofuran are stirred in to produce a clear solution. 3.54 g of N-bromosuccinimide are added and stirred in, followed by another 80 mL of tetrahydrofuran. Another 6.1 g of deionized water are then added to produce a clear solution. The clear solution is stirred for 4 hours at room temperature. During this time, the solution gradually turns orange in color.

375 mL of 2-propanol is added to the reaction solution over a period of 20 minutes. The brominated and halohydrated polymer precipitates from solution, is filtered, washed with 2-propanol, and re-dissolved into dichloromethane and again precipitated by addition of 2-propanol. The re-precipitated product is dried at 60° C. to a constant weight of 6.45 g.

An infrared spectrum of the dried product is taken. A strong band associated with an OH stretch is found at 3572 cm$^{-1}$. This band is missing from the partially brominated polymer prior to the halohydration step. Carbonyl groups are essentially absent. Proton NMR indicates the absence of carbon-carbon double bonds and the presence of hydroxylated carbon atoms. The 5% weight loss temperature of this product is about 264° C.

EXAMPLE 2

The same styrene-butadiene-styrene triblock copolymer described in Example 1 is partially brominated by reaction with tetraethylammonium tribromide according the general method described in WO 2007/021418 such that approximately 91% of the butadiene units are brominated. The partially brominated polymer is recovered from the reaction solvent and dried. 40 g of the partially brominated polymer is dissolved into a mixture of 1250 mL tetrahydrofuran, 103.7 g of deionized water and 20 g of N-bromosuccinimide to form a clear reaction solution that turns orange over time. The solution is stirred for 24 hours at room temperature. The brominated and halohydrated polymer is recovered in the same manner as described in Example 1.

Proton NMR indicates the presence of hydroxylated carbons at about 3.5 ppm and that approximately 2% of the aliphatic carbon-carbon double bonds of the starting material remain unreacted. The 5% weight loss temperature of this product is about 256° C.

A portion of the brominated and halohydrated polymer is compression molded at 180° C. under 25 tons pressure for 5 minutes on a platen press, and cooled to 20° C. On the press. A rectangular sample having dimensions of about 7.5×7.5×1.5 mm is cut from the compression molded material. The sample is heated to 125° C. in a sealed 50 mL batch foamer. Carbon dioxide is injected into the chamber to a pressure of 1000 psi, and the sample is maintained at that temperature and pressure for 3.5 hours to allow the carbon dioxide to dissolve into it. The pressure is then released within the heated chamber to rapidly depressurize the sample and cause it to expand and cool to produce a foam structure. The sample is immediately removed.

The foam structure is cut to expose the cell structure. The exposed surface is darkened with black ink to enhance contrast, and then examined under an optical microscope. The diameter of each cell in an image is measured along its longest axis. The average cell size and standard deviation are calculated.

For comparison, a sample of the partially brominated polymer is taken prior to the halohydration step, and formed into a foam in the same manner. The cell size of the foamed brominated and halohydrated polymer is significantly larger than that of the foamed partially brominated (but not halohydrated) material. This indicates a significant increase in the solubility of carbon dioxide due to the presence of the hydroxyl groups. The increased cell size is beneficial, as the formation of larger cells (instead of more, smaller cells) correlates to more efficient foam expansion, resulting in lower foam densities and improved ease of producing larger cross-sections at a given amount of blowing agent.

A portion of the brominated and halohydrated polymer is dissolved in toluene to form a 10% by weight solution. The interfacial energy of this solution against water is measured using the Du Nouy ring method. The force maximum is measured using a tensiometer equipped with an electronic force sensor, and the interfacial tension σ calculated as σ=F/(L−cos θ), where F is the measured force, L is the wetted length of the ring (calculated as the sum of the inner and outer circumference) and θ is the contact angle. Cos θ=1 for the platinum-iridium ring material.

The interfacial tension for the brominated and halohydrated material produced in Example, 2 is about 27 mN/m. For comparison, the interfacial system of the brominated but not halohydrated polymer is measured in the same manner, and found to be over 29 mN/m. These results indicate that the presence of hydroxyl groups on the brominated and halohydrated polymer affects the hydrophilicity of the material.

What is claimed is:

1. A brominated and halohydrated polymer made according to a process comprising (a) reacting a starting polymer of at least one conjugated diene with a quaternary ammonium tribromide, quaternary phosphonium tribromide compound or both a quaternary ammonium tribromide and a quaternary phosphonium tribromide to brominate 50% to 98% of the conjugated diene repeating units in the starting polymer to form a partially brominated polymer and then (b) reacting the partially brominated polymer with an N-haloimide compound in the presence of water and a water-miscible solvent system for the partially brominated polymer to halohydrate at least a portion of the remaining conjugated diene repeating units and produce a brominated and halohydrated polymer.

2. A brominated and halohydrated polymer of at least one conjugated diene, wherein 2 to 50% of the conjugated diene units of the polymer are halohydrated, 50 to 98% of the conjugated diene units are brominated and 0 to 10% of the conjugated diene units are unreacted, which brominated and halohydrated polymer has a 5% weight loss temperature of at least 250° C.

3. The brominated and halohydrated polymer of claim 1 wherein 5 to 35% of the conjugated diene units are halohydrated, 65 to 95% of the conjugated diene units are brominated, and 0 to 5% of the conjugated diene units are unreacted.

4. The brominated and halohydrated polymer of claim 1 wherein 2 to 25% of the conjugated diene units are halohydrated, 75 to 98% of the conjugated diene units are brominated, and 0 to 5% of the conjugated diene units are unreacted.

5. The brominated and halohydrated polymer of claim 4 wherein 5 to 20% are of the conjugated diene unites are halohydrated, 80 to 95% of the conjugated diene units are brominated, and 0 to 5% of the conjugated diene units are unreacted.

6. The brominated and halohydrated polymer ofclaim 2 which is a thermoplastic material that contains no more than 3 weight-percent and more preferably no more than 1 weight percent of gel material.

7. The brominated and halohydrated polymer of claim 2 which is crosslinked.

8. The brominated and halohydrated polymer of claim 2 which is in the form of particles having diameters from 500 nm to 25 μm.

9. A polyol composition comprising at least one polyol and the brominated and halohydrated polymer of claim 2.

10. An isocyanate-based polymer containing the brominated and halohydrated polymer of claim 2.

11. An extruded polymer foam containing a bulk polymer and the brominated and halohydrated polymer of claim 2.

12. A polymer blend comprising a bulk polymer which is one or more polymers or copolymers of styrene, a polyacrylate or polymethacrylate polymer or a mixture of any two or more thereof, and the brominated and halohydrated polymer of claim 2.

* * * * *